(12) United States Patent
Paternoster et al.

(10) Patent No.: US 11,623,402 B2
(45) Date of Patent: Apr. 11, 2023

(54) METHOD AND DEVICE FOR MAKING A THREE-DIMENSIONAL OBJECT

(71) Applicant: EOS GmbH Electro Optical Systems, Krailling (DE)

(72) Inventors: Stefan Paternoster, Andechs (DE); Stefan Grünberger, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 296 days.

(21) Appl. No.: 15/739,303

(22) PCT Filed: Jul. 6, 2016

(86) PCT No.: PCT/EP2016/001152
§ 371 (c)(1),
(2) Date: Dec. 22, 2017

(87) PCT Pub. No.: WO2017/008890
PCT Pub. Date: Jan. 19, 2017

(65) Prior Publication Data
US 2018/0169946 A1    Jun. 21, 2018

(30) Foreign Application Priority Data

Jul. 10, 2015 (DE) .................. 102015213011.8

(51) Int. Cl.
*B33Y 10/00* (2015.01)
*B33Y 30/00* (2015.01)
(Continued)

(52) U.S. Cl.
CPC .......... *B29C 64/314* (2017.08); *B22F 3/1017* (2013.01); *B22F 10/28* (2021.01);
(Continued)

(58) Field of Classification Search
CPC ... B29C 67/077; B29C 64/218; B29C 64/214; B29C 64/223; B29C 64/205;
(Continued)

(56) References Cited

U.S. PATENT DOCUMENTS

2002/0090313 A1    7/2002   Wang et al.
2004/0003738 A1*   1/2004   Imiolek ................. B22F 3/1055
                                                        101/480
(Continued)

FOREIGN PATENT DOCUMENTS

DE    102005022308    11/2006
EP        2859973     4/2015
(Continued)

OTHER PUBLICATIONS

"Laser Manufacturing Technology", edited by Shunhong Liu et al, University of Chemical Technology Press, pp. 302-303, Jun. 2011.

*Primary Examiner* — Francisco W Tschen
*Assistant Examiner* — Elisa H Vera
(74) *Attorney, Agent, or Firm* — Seyfarth Shaw LLP (57) ABSTRACT

A method for making a three-dimensional object by means of layer-wise application and selective solidification of a pulverulent building material The method includes applying a layer of the pulverulent building material onto a build area by an application device The application device includes a recoating unit movable across the build area in an application direction. The method further includes solidification of the applied powder layer at positions corresponding to a cross-section of the object to be made, and repeating the steps of applying and selective solidification until the object is completed. The pulverulent building material to be applied onto the build area is heated locally by a radiant heater before being applied.

24 Claims, 2 Drawing Sheets

(51) Int. Cl.

| | |
|---|---|
| *B33Y 50/02* | (2015.01) |
| *B29C 64/314* | (2017.01) |
| *B29C 64/153* | (2017.01) |
| *B29C 64/295* | (2017.01) |
| *B29C 64/393* | (2017.01) |
| *B29C 64/268* | (2017.01) |
| *B29C 64/205* | (2017.01) |
| *B29C 64/371* | (2017.01) |
| *B22F 3/10* | (2006.01) |
| *B28B 1/00* | (2006.01) |
| *B28B 17/00* | (2006.01) |
| *B28B 17/02* | (2006.01) |
| *B22F 10/30* | (2021.01) |
| *B29C 64/165* | (2017.01) |
| *B29C 64/214* | (2017.01) |
| *B22F 10/28* | (2021.01) |
| *B22F 12/13* | (2021.01) |
| *B22F 10/362* | (2021.01) |
| *B22F 10/20* | (2021.01) |
| *B22F 12/57* | (2021.01) |
| *B22F 12/67* | (2021.01) |
| *B22F 12/70* | (2021.01) |
| *B22F 10/34* | (2021.01) |

(52) U.S. Cl.
CPC ............ *B22F 10/362* (2021.01); *B22F 12/13* (2021.01); *B28B 1/001* (2013.01); *B28B 17/0081* (2013.01); *B28B 17/026* (2013.01); *B29C 64/153* (2017.08); *B29C 64/165* (2017.08); *B29C 64/205* (2017.08); *B29C 64/214* (2017.08); *B29C 64/268* (2017.08); *B29C 64/295* (2017.08); *B29C 64/371* (2017.08); *B29C 64/393* (2017.08); *B33Y 10/00* (2014.12); *B33Y 30/00* (2014.12); *B33Y 50/02* (2014.12); *B22F 10/34* (2021.01); *B22F 12/57* (2021.01); *B22F 12/67* (2021.01); *B22F 12/70* (2021.01)

(58) Field of Classification Search
CPC ... B29C 64/209; B29C 64/295; B29C 64/314; B29C 64/291; F05D 2230/20; F05D 2230/22; F05D 2230/30; F05D 2230/31; F05D 2230/312; F05D 2230/313; F05D 2230/314; B22F 3/008; B22F 3/1055; B28B 1/001
See application file for complete search history.

(56) References Cited

U.S. PATENT DOCUMENTS

| | | | |
|---|---|---|---|
| 2006/0118532 A1* | 6/2006 | Chung | B29C 64/153 |
| | | | 219/121.85 |
| 2006/0214335 A1* | 9/2006 | Cox | B01F 5/10 |
| | | | 264/497 |
| 2007/0298182 A1* | 12/2007 | Perret | B22F 3/1055 |
| | | | 427/427.3 |
| 2008/0120802 A1* | 5/2008 | Harvey | B05B 1/205 |
| | | | 15/405 |
| 2009/0068376 A1 | 3/2009 | Philippi et al. | |
| 2009/0206522 A1* | 8/2009 | Hein | B29C 64/153 |
| | | | 264/497 |
| 2010/0088845 A1* | 4/2010 | Kwon | A47L 9/248 |
| | | | 15/415.1 |
| 2011/0223349 A1* | 9/2011 | Scott | B29C 31/066 |
| | | | 427/532 |
| 2013/0108726 A1* | 5/2013 | Uckelmann | A61C 13/0019 |
| | | | 425/174.4 |
| 2015/0308741 A1* | 10/2015 | Chen | B29C 64/295 |
| | | | 34/553 |
| 2016/0193696 A1* | 7/2016 | Mcfarland | B23K 26/342 |
| | | | 219/76.12 |

FOREIGN PATENT DOCUMENTS

| | | |
|---|---|---|
| WO | 2008055615 | 5/2008 |
| WO | 2017008890 | 1/2017 |

* cited by examiner

METHOD AND DEVICE FOR MAKING A THREE-DIMENSIONAL OBJECT

TECHNICAL FIELD OF THE INVENTION

The present invention pertains to a method and device for making a three-dimensional object by means of layer-wise application and selective solidification of pulverent building material.

BACKGROUND OF THE INVENTION

Methods and devices of this kind are used for example for Rapid Prototyping, Rapid Tooling or Additive Manufacturing. An example of such a method is known under the name "selective laser sintering or laser melting". In this, repeatedly a thin layer of pulverent building material is applied and the building material is solidified by selective irradiation with a laser beam in each layer.

The total energy required to solidify the building material is not always provided by the laser at once but the building material is preheated prior to solidification. DE 10 2005 022 308 A1 describes a device for selective laser sintering wherein a powder as building material is applied to a working plane by a back and forth movable application device that includes a double blade comprising two stiff blades. For preheating the applied but not yet solidified powder layer a heating device in the form of one or more radiant heaters, e.g. infrared heaters, is positioned above the working plane. Further, the application device comprises an application device heater provided by heating wires incorporated in the blades.

SUMMARY OF THE INVENTION

The object of the present invention is to provide an alternative or improved method and an alternative or improved device to make a three-dimensional object by layer-wise application and selective solidification of powder as building material.

The object is obtained by a method according to claim 1, a construction set or retrofit kit according to claim 12, a preheating module according to claim 13 and a device according to claim 15. Further developments of the invention are indicated in the dependent claims, respectively. Therein, the methods may also be further developed by the features that are indicated below or the dependent claims of the devices or vice versa, or the features of the devices or methods might also be used for further developing each other.

The method for making a three-dimensional object by layer-wise application and selective solidification of powder as building material according to the invention comprises the following steps: Application of a layer of powder as building material on a build area by an application device, wherein the application device comprises a recoating unit movable across a build area in an application direction, selective solidification of the applied powder at positions corresponding to a cross-section of the object to be manufactured, and repeating the steps of applying and selectively solidifying until the object is completed. A radiant heater locally heats the pulverulent building material in the application device to be applied on the build area before the application. Thereby, it is possible to preheat the pulverulent building material in the application device prior to the application onto the build area without having to integrate any further heating device into the application device.

"Local" heating of the pulverulent building material in the application device within the context of the present invention shall be construed as the radiant heater being specifically designed (dimensioned) and positioned or oriented to heat the pulverulent building material within the application device as precisely as possible and shall not be construed in terms of a global effect of the radiant heater, e.g. heating effect on the whole build area. Therefore, the radiant heater is preferably substantially solely directed to the pulverulent powder in the application device.

Additionally, it should be noticed that the application device comprises obligatorily moveable elements (namely, at least the recoating unit), while additional stationary, that is not moving, elements are optional. Respective examples will be discussed below. Thereby, the application device can also comprise elements temporarily spaced apart from each other during processing and the application device can thereby also be understood as "application arrangement" in terms of an arrangement of multiple elements or components interacting in the broader sense for the application process.

For example, an application blade can be used as recoating unit which forms an application device by adding a container that is at least closed in the application direction as well as in the opposite direction (namely a preheating module as described further below). The local heating by the radiant heater is accomplished by the preheating module from which the pulverulent building material is supplied to the application blade after heating. Preferably, the recoating unit as such is at least partially closed in the application direction and in the opposite direction to provide at least direct local heating within the recoating unit by the respective (locally effective) radiant heater.

Preferably, the radiant heater heating the pulverulent building material to be applied on the build area in the application device before applying comprises a locally effective radiant heater substantially dimensioned such as to heat the pulverulent building material within the application device. Preferably, the radiant heater is operated in addition to a non-locally effective radiant heater. The latter is dimensioned such as to heat two-dimensionally by radiation the pulverulent building material after application on substantially the whole build area. Thereby, the pulverulent building material can be preheated in an effective and efficient manner.

Preferably, the application device is filled with the pulverulent building material at a filling location and the radiant heater is spaced apart from the filling location in an application direction or in the opposite direction. Thereby, among others, it is prevented that the radiant heater already preheats the powder located at the filling location.

Preferably, the radiant heater is stationary and the application device is moved to the location of the radiant heater (i.e. the location from which the radiant heater can radiate in the application device) before applying a layer of powder to heat the pulverulent building material within the application device by the radiant heater. Thereby, it is possible to provide a simple design of the device comprising the application device and the radiant heater since the application device (or elements of the application device, namely, at least the recoating unit) has to be arranged movably anyway.

Alternatively, the radiant heater is moved together with the application device. Thereby, the cooling of the pulverulent building material in the application device during movement of the application device is prevented.

Preferably, the application device comprises a preheating module arranged in at least one intended operational position between a recoating unit of the application device and the radiant heater, whereby the preheating module receives a portion of the pulverulent building material, the pulverulent building material is at least also heated in the preheating module by means of the radiant heater and the heated pulverulent building material is transferred from the preheating module to the recoating unit (directly or indirectly). Thereby, it is possible to heat the pulverulent building material uniformly in the preheating module and to supply the pulverulent building material in a heated condition to the recoating unit whereby the temperature distribution of the pulverulent building material within the application device is homogenized.

Further, the application device may comprise an additional unit, in particular a dosing unit, between the preheating module and the recoating unit (i.e. provided in the dosing direction of the pulverulent building material between the preheating module within the recoating unit). Such a unit preferably is moved during applying the layer together with the recoating unit and meters the pulverulent building material (particularly during movement/specifically continuously) into the recoating unit.

The following arrangement shall serve as an example: The preheating module is a stationary unit, in which the pulverulent building material is heated locally as described above. The dosing unit moves together with the recoating unit during application of the layer by means of the recoating unit. In this embodiment, the preheating module as well as the dosing unit are fluidized.

The preheating module provides a larger area heatable by the radiant heater in comparison to the dosing unit to achieve most effective local heating as per the present invention. Due to the combination of the larger area and the fluidization the pulverulent building material is heated effectively and mixed thoroughly, whereby the good contact between the particles of the pulverulent building material results in a good heat exchange between the particles. The mixing can further be supported by incorporating a stirring unit.

Preferably, the pulverulent building material in the dosing unit is not exposed to a further local heating by a respective radiant heater but at the most kept warm actively or passively.

The pulverulent building material can also already be heated to a threshold temperature, in particular below its glass transition temperature, within a storage container before being supplied to the preheating module. This can be done by a heating device incorporated in the wall of the storage container.

Preferably, the preheating module is moved together with recoating unit. Further preferably, the pulverulent building material is heated by the radiant heater during the movement of the preheating module together with the recoating unit. Thereby, the temperature distribution of the pulverulent building material can be further homogenized.

Preferably, the pulverulent building material to be applied to the build area is fluidized during heating, in particular preferably by passing through heated gas, preferably a protective gas. This makes it possible to achieve a particularly thorough mixing and thus a more homogenized temperature distribution of the pulverulent building material within the application device.

Preferably, the radiant heater is arranged at a predefined distance to the surface of the pulverulent building material to be heated. This prevents, for example, a contamination of the radiant heater by soaring powder.

The construction set or retrofit kit for a device for making a three-dimensional object by selective solidification of pulverulent building material according to the present invention comprises an application device adapted to apply a layer of the pulverulent building material to a build area, wherein the application device contains a recoating unit to be moved over the build area in an application direction, wherein the recoating unit is movable within the device in an application direction, and a radiant heater adapted to locally heat, in interaction with the application device, the pulverulent building material to be applied to the build surface in the application device prior to application. This makes it possible, for example, to retrofit existing devices to execute the method according to the present invention.

The preheating module according to present invention is, in particular but not necessarily, intended and provided for a construction set or retrofit kit as described above. The preheating module comprises a container for receiving pulverulent building material and a dosing unit to supply the pulverulent building material heated by the radiant heater to the recoating unit within the application device or to the unit between the preheating module and the recoating unit as mentioned above, e.g. the dosing unit as described above. This makes it possible, inter alia, to separate the operations of preheating and applying spatially and temporally from each other. Such spatial separation is also possible when using a non-local, in other words global, radiant heater. Therefore, the preheating module according to the present invention does not have to be necessarily designed as a further development of the construction set or retrofit kit according to the present invention.

Preferably, the preheating module comprises at least one of the following elements:
- a fluidization unit to fluidize the pulverulent building material received in the container,
- a stirring unit to mix the pulverulent building material received in the container,
- a purging unit to blow potentially whirled up pulverulent building material off the radiant heater.

As a result of the fluidization unit and/or stirring unit, a particularly thorough mixing and thus a more homogenized temperature distribution of the pulverulent building material within the application device is achieved. The purging unit prevents, for example, a contamination of the radiant heater by soaring powder.

The device for making a three-dimensional object by selective layer-wise solidification of pulverulent building material according to the present invention comprises an application device movable over a build area in an application direction, comprising a recoating unit movable over the build area in an application direction, to apply a layer of pulverulent building material to the build area, a solidification device to selectively solidify the applied powder layer at positions corresponding to a cross-section of the object to be made, and a radiant heater. The device is designed and/or controlled to repeat the steps of applying and selectively solidifying until the object is completed, and to locally heat the pulverulent building material to be applied on the build area within the application device by the radiant heater before applying. Thereby, it is possible to perform the method according to the present invention by a device for making a three-dimensional object.

Preferably, the device further comprises a construction set or retrofit kit and/or a preheating module as described above. By this, the device provides the described effects of the construction set or retrofit kit and/or preheating module.

BRIEF DESCRIPTION OF THE DRAWINGS

Further features and advantages of the invention will arise from the description of embodiments by reference to the appended drawings.

DETAILED DESCRIPTION OF THE EMBODIMENTS

Figure 1:
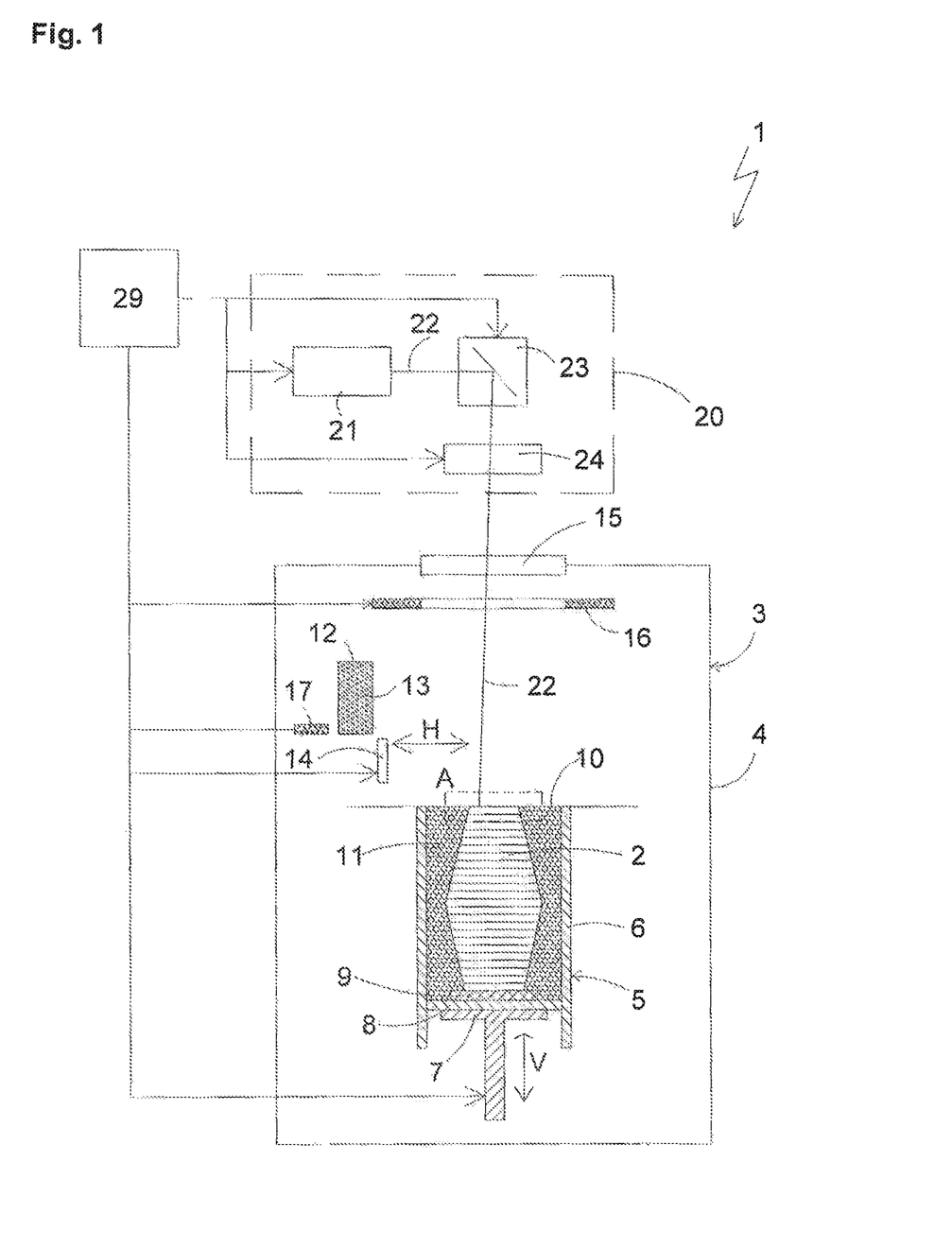
FIG. 1 is a schematic view partially illustrated in cross-section of an embodiment of a device for layer-wise making a three-dimensional object according to the first embodiment of the present invention.

In the following, an embodiment of a device 1 according to the first embodiment of the present invention is described with reference to FIG. 1. The device illustrated in FIG. 1 is a laser sintering or laser melting device 1. In order to make an object 2, it includes a process chamber 3 having a chamber wall 4.

In the process chamber 3, a container 5 is arranged which is open at the top and has a container wall 6. In the container 5, a carrier 7 is arranged which is movable in a vertical direction V and at which a base plate 8 is mounted, closing the container 5 at the bottom and thereby forming its ground. The base plate 8 may be a plate which is formed separately from the carrier 7 and which is mounted at the carrier 7, or it may be formed integrally with the carrier 7. Depending on the powder used and the process performed, a building platform 9 on which the object is built may be mounted as a building base to the base plate 8. The object 2 may, however, also be built on the base plate 8 itself, which then serves as a building base. In FIG. 1 the object 2 to be built in the container 5 on the building platform 9 is illustrated below the working plane 10 in an intermediate state including multiple solidified layers, surrounded by building material 11 that has been remained unsolidified.

The laser sintering device 1 further contains a storage container 12 for a pulverulent building material 13 which is solidifyable by means of electromagnetic radiation, and an application device 14 movable in a horizontal direction H for applying the building material 13 on the working plane 10. The chamber wall 4 of the process chamber 3 contains at its topside a coupling window 15 for radiation to solidify the powder 13. Further, a global radiant heater 16 and a local radiant heater 17 are arranged within the process chamber. The global radiant heater 16 is designed to heat the whole build area, i.e. the portion of the working plane 10 within the opening at the top of the container 5, while the local radiant heater 17 is designed to only heat a locally restricted area.

The laser sintering device 1 further contains an irradiation device 20 comprising a laser 21 which generates a laser beam 22 which is deflected by a deflecting device 23 and focused onto the working plane 10 by means of a focusing device 24 through the coupling window 15.

Further, the laser sintering device 1 includes a control unit 29, by means of which the individual constituent parts of the device 1 are controlled in a coordinated manner in order to perform the building process. The control unit may include a CPU, the operation of which is controlled by a computer program (software). The computer program may be stored separately from the device on a storage medium, from which it may be loaded into the device, particularly into the control unit.

In operation, in order to apply a powder layer, the carrier 7 is first lowered by a height, which corresponds to the desired layer thickness. A layer of pulverulent building material 13 is applied by moving the application device 14 over the working plane 10. The application is carried out at least across the whole cross-section of the object 2 to be built, preferably across the whole build area. The applied powder layer is preheated by the global radiant heater 16. Subsequently, the cross-section of the object 2 to be built is scanned by the laser beam 22 so that the pulverulent building material 13 is solidified at positions which correspond to the cross-section of the object 2 to be built. These steps are repeated until the object 2 is completed and can be removed from the process chamber.

Figure 2:
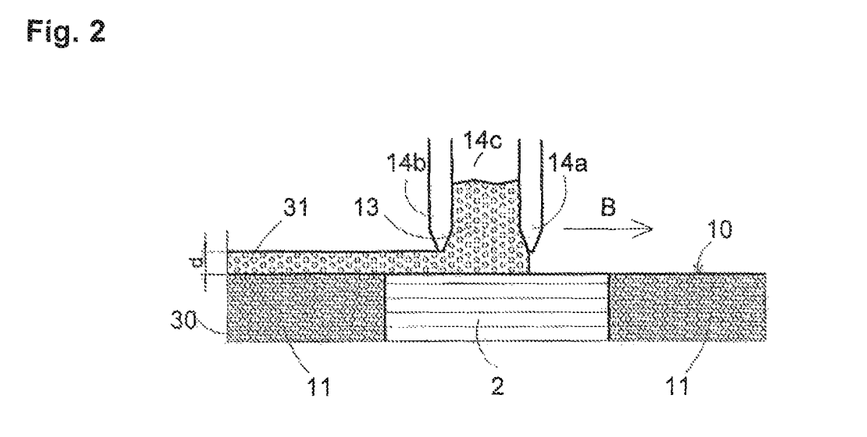
FIG. 2 is an enlarged schematic view of a portion of the device shown in FIG. 1 and indicated by a dotted line during an application of a powder layer.

FIG. 2 shows an enlarged schematic view of section A framed in FIG. 1 by a dotted line.

After applying and solidifying of a powder layer 30, the solidified portion of the object 2 to be built is surrounded by remaining unsolidified powder. By means of movement of the application device 14 in an application direction B, a further powder layer 31 of the building material 13 is applied onto the previously applied and selectively solidified powder layer 30.

As shown in FIG. 2, the application device 14 comprises a recoating unit comprising a blade lying ahead in respect of the application direction (front blade 14a) and a blade lying behind in respect of the application direction (rear blade 14b). Both blades at least partially enclose a space 14c in the application direction B and in the opposite direction.

The space restricted by the blades 14a, 14b is configured to receive a stock of pulverulent building material 13. When moving the application device 14 in the application direction B a portion of the pulverulent building material 13 remains on the previous layer 30 and is drawn out by the rear blade 14b to a uniform thin powder layer 31 with a thickness d. During and after the application of the powder layer 31, the global radiant heater 16 acts on the already applied areas of the powder layer 31 or the completely applied powder layer 31.

However, in particular for higher working temperatures to be achieved, particularly required for processing plastic powder, the heating by means of a global radiant heater 16 may not be sufficient. Therefore, the pulverulent building material 13 is already preheated before applying it as powder layer 31.

According to the invention, the pulverulent building material 13 is preheated by means of the local radiant heater 17. The local radiant heater 17 is dimensioned so as to heat the pulverulent building material 13 in the application device 14 but not the whole applied powder layer 31.

In this embodiment, to apply a powder layer 31, the recoating unit 14a-c of the application device 14 moves first to the storage container 12 and receives a predetermined amount of the pulverulent building material 13. The predetermined amount of powder is preferably equal to or greater than the amount of powder required to apply a layer of pulverulent building material 13. Subsequently, the recoating unit 14a-c moves to a location below the local radiant heater 17 which is arranged in front or behind the storage container 12 in respect of the application direction B. The radiant heater 17 is preferably arranged in at least a predefined vertical distance from the surface of the pulverulent building material 13 to be heated. Preferably, the radiant heater 17 is separated from the storage container 12 by a predetermined lateral distance.

The amount of powder received by the recoating unit 14a-c is heated by means of the local radiant heater 17. When the powder is sufficiently heated, the recoating unit 14a-c moves across the working plane 10 and thereby applies the powder layer as described above.

By preheating the pulverulent building material 13 by means of the local radiant heater 17 before applying it as powder layer 31 a higher temperature may be achieved in the applied powder layer more rapidly without having to integrate any additional heating device containing heating wires in the recoating unit 14a-c. This requires less heating time by the global radiant heater 16 and therefore less building time resulting in an increased productivity. Further, the applied layers are warmed up more uniformly and temperature peaks, as those may occur in contact with a heating device with heating wires, are prevented, whereby the quality of the object built may be increased.

In a variation of the first embodiment, the local radiant heater 17 is not arranged stationary but moves together with the recoating unit 14a-c. By this, the heating process may be continued during the application process and it can be prevented that preheated powder cools down during the application.

Figure 3:
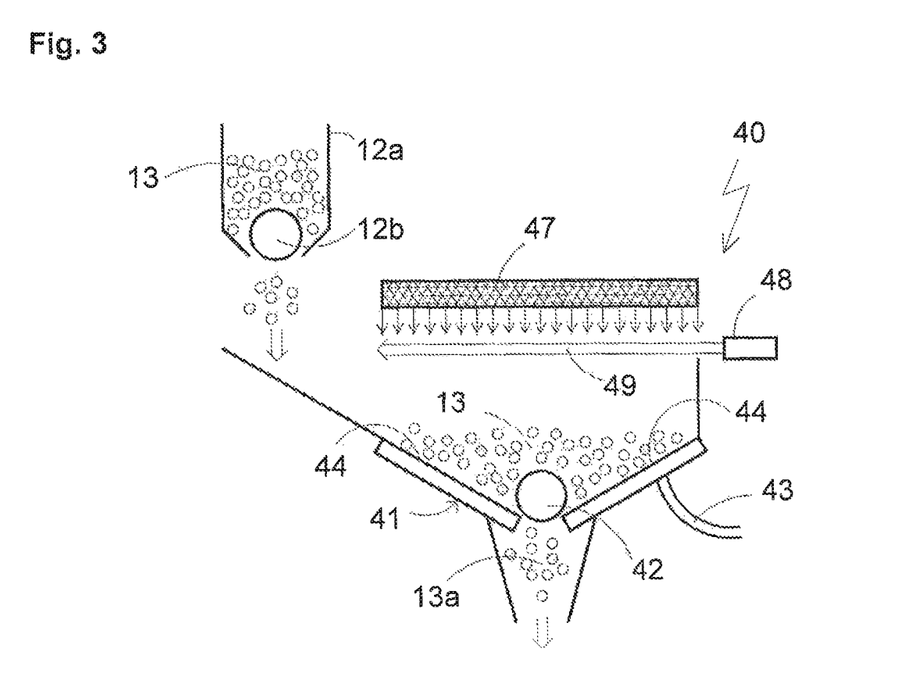
FIG. 3 is a schematic view of a preheating module according to a second embodiment of the present invention.

While the preheating of the pulverulent building material by means of the local radiant heater according to the first embodiment is conducted within the movable recoating unit which also applies the powder to the working plane, the application device according to a second embodiment to preheat the pulverulent building material comprises a preheating module which is provided separately from the recoating unit. FIG. 3 shows an enlarged schematic cross-sectional view of the preheating module according to the second embodiment.

The preheating module 40 comprises a container 41 with a funnel-shaped cross-section designed to receive a predetermined amount of pulverulent building material 13, and a dosing unit 42 designed to supply pulverulent building material in a dosed manner to the movable (not shown in the figure) recoating unit 14a-c.

Preferably, the preheating module 40 further comprises a gas supply 43 to supply a gas, preferably a shielding gas, to the interior of the container 41 to fluidize the pulverulent building material 13. The gas enters the container 41 via the interior wall 44 of the container 41, wherein the interior wall 44 may provide openings or is provided as a porous plate, and/or via a its own fluidization insert (not shown in the figure).

The preheating module 40 further comprises a radiant heater to heat the pulverulent building material 13 received within the container 41. The radiant heater 47 is preferably arranged at least in a predefined vertical distance from the surface of the pulverulent building material 13 to be heated or from the other elements of the preheating module 40.

Further, the preheating module 40 comprises a purging unit 48 capable of generating a gas flow 49.

In operation, the preheating module 40 receives in the container 41 a predetermined amount of unheated pulverulent building material 13 from a powder outlet 12a of the storage container 12 by means of its dosing unit 12b. The predetermined amount of powder is preferably equal to or greater than the amount of powder required to apply a layer of the pulverulent building material 13. The powder received in the container 41 is heated by means of the radiant heater 47. In addition, the powder may fluidized by means of a gas, particularly a heated gas, supplied by the gas supply 43 and/or may be mixed by means of a stirring unit (not shown in the figure). Meanwhile, the purging unit 48 generates a gas flow 49, preferably of protective gas, between the surface of the pulverulent building material 13 and the radiant heater 47. Thereby, it is prevented that whirled up powder 13 reaches and therefore contaminates the surface of the radiant heater 47. The preheated powder 13a is supplied to the recoating unit 14a-c, as described according to the first embodiment, by means of the dosing unit 42 of the preheating module. The recoating unit 14a-c applies a powder layer 31 of the preheated powder.

In doing so, the preheating module 40 may be arranged stationary in proximity to the powder outlet 12a of the storage container 12 and may supply the whole amount of powder to the recoating unit 14a-c required to apply a powder layer 31 before the recoating unit 14a-c moves across the build area. Alternatively, the preheating module 40 may move together with the recoating unit 14a-c across the build area and may provide repeated or gradual supply of powder to the recoating unit 14a-c in terms of subsequent dosing.

With the preheating module arranged apart from the recoating unit 14a-c so that the processes of preheating and applying are spatially and temporally separated from each other, it is particularly possible to heat the pulverulent building material homogenously and rapidly, to prevent lumps and to perform an optimized dosing into the recoating unit.

The shape of the container of the preheating module is not restricted to the above described funnel shape but may be any shape that is suitable to receive and heat a limited amount of powder.

The features of the above described embodiments may, wherever possible, be combined with one another. For example, a purging unit, as described for the radiant heater 47 of the second embodiment, may also be provided for the stationary or for the radiant heater 17 movable with the recoating unit of the first embodiment. As another example, the fluidization that is optionally carried out within the preheating module according to the second embodiment, may also be carried out in the recoating unit 14a-c.

The application may also be performed by means of an application device moving back and forth in two application directions. In such event, a storage container and/or a stationary local radiant heater may be arranged at both sides of the build area or the local radiant heater may be moved together with the recoating unit.

The type of recoating is not restricted to the above described translational recoating and may also be implemented as rotational recoating. In such event, the application direction is the rotation direction of the recoating unit during application.

Even though the present invention has been described with regard to a laser sintering device or a laser melting device, it is not restricted to laser sintering or laser melting. It may rather be applied to any arbitrary method for making a three-dimensional object by layer-wise applying and selective solidification of a pulverulent building material.

The laser may for example comprise one or multiple gas or solid body laser(s) or any other kind of laser. Generally, any device which is able to selectively irradiate energy in form of a wave or particle radiation onto a layer of the building material can be used as an irradiation device. Instead of a laser, for example another light source, an electron beam or any other energy or radiation source suited to solidify the building material may be used. The invention may also be applied to the selective mask sintering, wherein an extended light source and a mask are used, or to the absorption sintering or inhibition sintering.

Instead of applying energy, the selective solidification of the applied building material may also be performed by means of 3D-printing, for example by applying an adhesive. Generally the invention is related to the additive manufacturing of an object by means of applying and selectively solidifying a building material layer by layer independent from the kind and manner in which the building material is solidified.

Various kinds of powder may be used as the building material, preferably metal powder, plastic powder, ceramic powder, sand, or filled or mixed powders.

Depending on the used building material, a protective gas to fluidize the pulverulent building material and/or to purge the radiant heat is utilized which causes essentially no chemical reactions, for example preferably nitrogen for plastic powder or argon and/or nitrogen for metal powders.

The invention claimed is:

1. A method for making a three-dimensional object by layer-wise application and selective solidification of a pulverulent building material comprising the steps of:
   locally preheating the pulverulent building material to be applied in an applied powder layer by a preheating radiant heater which is associated with a preheating unit that receives the pulverulent building material from a separate supply, the preheating radiant heater being arranged stationary to the preheating unit and being a locally effective radiant heater for the preheating unit, the preheating radiant heater being arranged a vertical distance above and spaced from an upper surface of the pulverulent building material that is preheated within the preheating unit, the preheating radiant heater being located to extend its heating in an area confined to the surface of the pulverulent building material;
   applying the pulverulent building material as the applied layer onto a build area by an application device, wherein the application device comprises a recoating unit movable across the build area in an application direction;
   selectively solidifying the applied powder layer at positions corresponding to a cross-section of the object to be made;
   repeating the steps of applying and selectively solidifying until the object is completed; and
   providing, in addition to the locally effective radiant heater of the preheating unit, a non-locally effective radiant heat source that heats the pulverulent building material after being applied on the build area across the entire build area,
   wherein the application device is in communication with an outlet of the preheating unit in at least one operational position of the application device at an end of travel of the application device across the build area, the preheating unit being arranged stationary and separate from the application device, wherein a portion of the pulverulent building material is received by the preheating unit using a supply dosing unit that meters the pulverulent building material, the pulverulent building material is heated in the preheating unit by the preheating radiant heater and the heated pulverulent building material is transferred from the preheating unit to the recoating unit using a preheating unit dosing unit that meters the pulverulent building material into the recoating unit, and further comprising fluidizing the pulverulent building material in the preheating unit by passing heated protective gas through the pulverulent building material.

2. The method according to claim 1, wherein the recoating unit is at least partially closed in the application direction and in an opposite direction to the application direction.

3. The method according to claim 1, further comprising continuously operating the preheating radiant heater until the object is completed.

4. The method according to claim 1, further comprising arranging the locally effective radiant heater a predefined distance from the surface of the pulverulent building material to be heated.

5. A method for making a three-dimensional object by layer-wise application and selective solidification of a pulverulent building material comprising the steps of:
   applying a layer of the pulverulent building material onto a build area with an application device, the application device comprising a recoating unit movable across the build area in an application direction, the recoating unit having a well formed therein which receives the pulverulent building material at a top end and discharges the pulverulent building material through a bottom end as the recoating unit moves across the build area;
   providing a supply of the pulverulent building material;
   providing a preheating module into which the pulverulent building material is fed from the supply, the preheating module being stationarily mounted relative to the supply and the recoating unit and arranged to deliver pre-heated pulverulent building material to the well when the recoating unit is temporarily positioned under an outlet of the preheating module in a course of movement of the application device, the preheating module defining an interior space within which pulverulent building material is supplied; and
   providing a metering device at a bottom of the interior space upstream from the outlet, the preheating module further including a preheating radiant heater located above and spaced from a surface of the pulverulent building material supplied to the interior space, the preheating radiant heater being located to extend its heating in an area confined to the surface of the pulverulent building material,
   wherein a portion of the pulverulent building material is received by the preheating module interior space from the supply using a supply dosing unit that meters the pulverulent building material, the pulverulent building material is heated in the preheating module by the radiant heater to a predetermined preheated temperature, and further comprising fluidizing the pulverulent building material in the preheating unit by passing heated protective gas through the pulverulent building material, the preheated pulverulent building material is transferred from the preheating module to the recoating unit through a controlled discharge from the outlet using the metering device.

6. The method of claim 5, wherein the radiant heater is operated continuously throughout applying of a layer to thereby maintain the pulverulent building material within the preheating module at a generally constant temperature.

7. The method of claim 5, further comprising providing a further radiant heater in addition to the radiant heater of the preheating module that globally heats the layer of the pulverulent building material after being applied by the application device.

8. The method of claim 5, wherein the preheating module further comprises a fluidization unit for supplying a protective gas to the interior space of the preheating module to fluidize the pulverulent building material received therein.

9. The method of claim 5, wherein the preheating module further comprises a stirring unit that mixes the pulverulent building material received in the interior space.

10. The method of claim 5, wherein the preheating module further comprises a purging unit that blows pulverulent building material off the radiant heater.

11. The method according to claim 5, further comprising arranging the radiant heater a predefined distance from the surface of the pulverulent building material to be heated.

12. A method for making a three-dimensional object by layer-wise application and selective solidification of a pulverulent building material in an Additive Manufacturing (AM) apparatus which generatively builds the object by fusing consecutive layers of the pulverulent building material corresponding to respective cross sections of the object using a source of energy that fuses the pulverulent building material in a layer, comprising the steps of:

applying a layer of the pulverulent building material onto a build area with an application device, the application device comprising a recoating unit movable across the build area in an application direction, the recoating unit having a space formed therein which receives the pulverulent building material at a top end from a supply and discharges the pulverulent building material through a bottom end as the recoating unit moves across the build area;

the AM apparatus further comprising a preheating module into which pulverulent building material is fed from a supply, the preheating module being arranged separate from the recoating unit and stationarily located at a point of travel of the recoating unit, and arranged to deliver pre-heated pulverulent building material to the space when the recoating unit is temporarily located adjacent an outlet of the preheating module, the preheating module defining a container within which the pulverulent building material is supplied and a dosing device at a bottom of the container, the preheating module further including a preheating module radiant heater located above and spaced from a surface of the pulverulent building material supplied to the container, the preheating radiant heater being located to extend its heating in an area confined to the surface of the pulverulent building material; and heating the pulverulent building material within the preheating module to a temperature below a melting temperature of the pulverulent building material, wherein a portion of the pulverulent building material is received by the preheating module container from the supply using a supply dosing unit that meters the pulverulent building material, the pulverulent building material is heated in the preheating module by the preheating module radiant heater, and further comprising fluidizing the pulverulent building material in the preheating unit by passing heated protective gas through the pulverulent building material, and the preheated pulverulent building material is transferred from the preheating module to the recoating unit through a controlled discharge using the dosing device.

13. The method of claim 12, wherein the preheating module radiant heater is operated continuously throughout the applying of a layer to thereby maintain the pulverulent building material within the preheating module at a generally constant temperature.

14. The method of claim 12, further comprising providing a further radiant heater in addition to the radiant heater of the preheating module that globally heats the layer of the pulverulent building material after being applied by the application device.

15. The method of claim 12, wherein the preheating module further comprises a fluidization unit that supplies a protective gas to the container of the preheating module to fluidize the pulverulent building material received therein.

16. The method of claim 12, wherein the preheating module further comprises a stirring unit that mixes the pulverulent building material received in the container.

17. The method of claim 12, wherein the preheating module further comprises a purging unit that blows pulverulent building material off the radiant heater.

18. The method according to claim 12, further comprising arranging the radiant heater a predefined distance from the surface of the pulverulent building material to be heated.

19. A method for making a three-dimensional object by layer-wise application and selective solidification of a pulverulent building material in an Additive Manufacturing (AM) apparatus which generatively builds the object by fusing consecutive layers of the pulverulent building material corresponding to respective cross sections of the object using a source of energy that fuses the pulverulent building material in a layer, comprising the steps of:

applying a layer of the pulverulent building material onto a build area with an application device, the application device comprising a recoating unit movable across the build area in an application direction from a first end of the build area to a second opposed end of the build area, the recoating unit having a space formed therein which receives the pulverulent building material at a top end from a supply and discharges the pulverulent building material through a bottom end as the recoating unit moves across the build area;

providing at least one supply of unheated pulverulent building material in a supply container which is located in fixed relation at an end of the build area, the supply further having a first dosing unit;

feeding the pulverulent building material into a preheating module of the AM apparatus, the preheating module being arranged separate from the recoating unit and also separate from the supply and arranged to receive pulverulent building material from the supply and then to deliver pre-heated pulverulent building material to the recoater space, the preheating module defining a container having an interior within which the pulverulent building material is supplied, a second dosing device at a bottom of the container, and a preheating module radiant heater located above and spaced from the pulverulent building material surface, the preheating module radiant heater being dimensioned so as to heat substantially only pulverulent building material within the preheating module, said preheating module radiant heater being located to extend its heating in an area confined to the surface of the pulverulent building material;

and heating the pulverulent building material within the preheating module to a temperature below a melting temperature of the pulverulent building material, and further comprising fluidizing the pulverulent building material in the preheating unit by passing heated protective gas through the pulverulent building material;

wherein a portion of the pulverulent building material is received by the preheating module container from the supply through a controlled discharge using the first dosing unit of the supply, the pulverulent building material is heated in the preheating module by the preheating module radiant heater, and the preheated pulverulent building material is transferred from the preheating module to the recoating unit through a controlled discharge using the second dosing device of the preheating unit.

20. The method of claim 19, wherein the preheating module radiant heater is operated continuously throughout the applying of a layer to thereby maintain the pulverulent building material within the preheating module at a generally constant temperature.

21. The method of claim 19, wherein the pulverulent building material is not further heated within the recoating unit.

22. The method of claim 19, further comprising providing a global radiant heater in addition to the radiant heater of the preheating module that globally heats the layer of the pulverulent building material after being applied by the recoating unit.

23. The method of claim 19, wherein the preheating module further comprises a fluidization unit that supplies a protective gas to the container of the preheating module to fluidize the pulverulent building material received therein.

24. The method of claim 19, wherein the preheating module further comprises a purging gas unit that blows gas across a bottom of the radiant heater of the preheating module to thereby clear pulverulent building material off the radiant heater.

* * * * *